United States Patent [19]

Botcherby

[11] 3,855,594

[45] Dec. 17, 1974

[54] MULTIPLE FREQUENCY CONTINUOUS WAVE RADARS

[75] Inventor: Stephen Charles Lauder Botcherby, London, England

[73] Assignee: DECCA Limited, London, England

[22] Filed: May 2, 1973

[21] Appl. No.: 356,607

[30] Foreign Application Priority Data
May 3, 1972 Great Britain.................... 20636/72

[52] U.S. Cl................................. 343/7.5, 343/12 R
[51] Int. Cl............................................... G01s 9/04
[58] Field of Search........................... 343/12 R, 7.5

[56] References Cited
UNITED STATES PATENTS

| | | | |
|---|---|---|---|
| 3,140,488 | 7/1964 | Girault.............................. | 343/12 R |
| 3,155,972 | 11/1964 | Boyer................................ | 343/12 R |
| 3,300,780 | 1/1967 | Mason............................... | 343/12 R |
| 3,634,860 | 1/1972 | Rittenbach..................... | 343/12 R X |
| 3,730,628 | 5/1973 | Wolcott........................... | 343/7.5 X |
| 3,766,554 | 10/1973 | Tresselt......................... | 343/12 R X |

*Primary Examiner*—Malcolm F. Hubler
*Attorney, Agent, or Firm*—Mawhinney & Mawhinney

[57] ABSTRACT

A multiple frequency continuous wave radar in which two Doppler signals derived from different transmitted frequencies are multiplied together and the product signal, after integration, controls a waveform generator which switches the transmitted frequency. The difference between the transmitted frequency is controlled to render the Doppler signals in quadrature and a range indicator responds universely to the frequency difference. Another Doppler signal is multiplied with one of the first two in a circuit which corrects ambiguity.

10 Claims, 2 Drawing Figures

MULTIPLE FREQUENCY CONTINUOUS WAVE RADARS

BACKGROUND OF THE INVENTION

The invention relates to multiple frequency continuous wave radars. As is known from, for example, "Introduction to Radar Systems" by M. I. Skolnik, McGraw-Hill, 1962 pages 106 to 111 by comparing two transmitted frequencies with respective echo spectra one can obtain beat frequency (Doppler) signals of which the phase difference represents the range of a target from the radar transmitter. However the use of this type of radar is limited by its unsuitability for use where there is more than one possible target or where the target is random, its position not being known in advance.

BRIEF SUMMARY OF THE INVENTION

The main object of the present invention is to aleviate the aforementioned disadvantage and accordingly provide a more versatile multiple frequency continuous wave radar.

The present invention accordingly particularly concerns a multiple frequency continuous wave radar in which Doppler signals obtained using a respective one of two transmitted frequencies as a reference are multiplied together and a signal thereby obtained is used to control the difference in frequency of the said two transmitted frequencies such as to tend to render the said Doppler signals in quadrature. By this means it is readily possible to track the range of the target continuously and provide a continuous indication of that range.

BRIEF DESCRIPTION OF THE ACCOMPANYING DRAWINGS

FIG. 1 illustrates schematically a radar constructed in accord with the invention; and FIG. 2 illustrates a modified form of the radar illustrated in FIG. 1.

DESCRIPTION OF THE PREFERRED EMBODIMENTS

Figure 1:
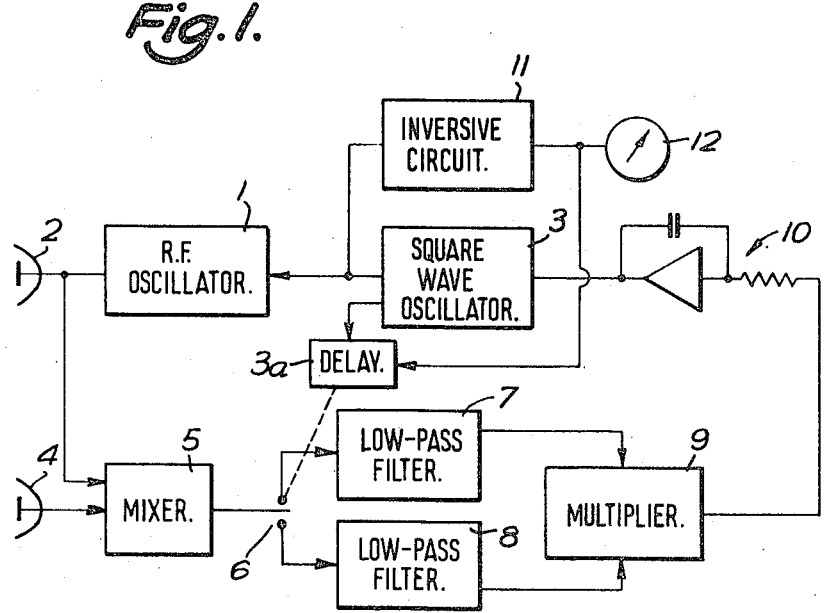

In FIG. 1 is shown a transmitter comprising a radio frequency oscillator 1 arranged to feed an aerial 2. The frequency of the oscillator is adjustable and at any time depends on the magnitude of an output signal from a voltage-controlled square wave oscillator 3; thus the frequency of the oscillator 1 will alternate between two frequencies of which the difference is proportional to the amplitude of the square wave from the oscillator 3. The frequency of the oscillator 3 may be 40 KHz. and the frequencies produced by the oscillator 1 may be above 10 GHz. The variation in the transmitted frequency may be of the order of 40 MHz.

A receiver is constituted by an aerial 4, a mixer 5, a switch 6 and low pass filters 7 and 8. Signals received by the aerial 4 are passed to one input of the mixer 5 wherein they are mixed with the concurrent frequency of the transmitter, conveniently obtained from an output of the radio-frequency oscillator 1. The output of the mixer is fed to the switch 6, which is switched at the frequency of the square wave oscillator 3 so as to direct the output of the mixer to the low pass filters 7 and 8 alternately.

The switch 6 is operated by the square wave oscillator 3 via a controllable delay 3a which is controlled by a signal denoting the measured range in order to avoid errors when the range becomes a significant proportion of a wavelength at the frequency of the square wave oscillator.

The switch 6 and the filters 7 and 8 provide a means of obtaining two Doppler signals corresponding to the beat frequency between a respective one of the transmitted frequencies and the corresponding echo signal from the target.

Owing to the difference between the transmitted frequencies the Doppler signals differ in phase. The relative phase is a measure of the elapsed time between radiation from the transmitter and reception of the echo signal and represents the range unambiguously up to a phase difference of $2\pi$ radians at which the measurement of phase and hence the range becomes ambiguous.

The obtained Doppler signals are multiplied together and for this purpose they are fed to respective inputs of a four-quadrant multiplier 9. The output of the multiplier 9 will be zero if the phase difference is $\pi/2$ radians. An important part of this invention is the control of the difference between the radiated frequencies by means of the output of the multiplier so as to tend to reduce this output to zero and accordingly maintain the phase difference between the obtained Doppler signals at $\pi/2$ radians.

The output of the multiplier is fed through an integrator 10, consisting of an operational amplifier with resistive input impedance and capacitative feedback. The output of the integrator is fed to a control input of the square wave oscillator 3. This oscillator is arranged in a manner known per se so that the amplitude of the square wave is proportional to the direct voltage appearing across the output of the integrator 10.

With this arrangement, any change away from zero of the output of the multiplier 9 will be counteracted. Thus if the output of the multiplier 9 increases in a sense corresponding to an increase of the phase difference between the Doppler signals and corresponding thereby to an effective decrease in the frequency difference of the transmitted signals, there will be a compensatory increase in the amplitude of the square wave output from the oscillator 3 and an increase in the frequency excursion of the oscillator 1 so as to tend to reduce the output of the multiplier 9.

It can readily be shown that, if the phase difference between the Doppler signals is $a$, the range to the target is R and the effective wavelength of a signal of frequency corresponding to the difference between the transmitted signals is $1_d$, then $a = \pi/2$ when $R=(1_d)/8$. The range R will be inversely proportional to the difference between the transmitted frequencies, the output of the integrator and the amplitude of the square wave output from the oscillator 3. Means responsive to any of these linked variables can be provided for indicating the range. In this embodiment an inversive circuit 11 develops a direct signal inversely proportional to the amplitude of the square wave generator and feeds a range meter 12 and the controllable delay 3a.

Figure 2:
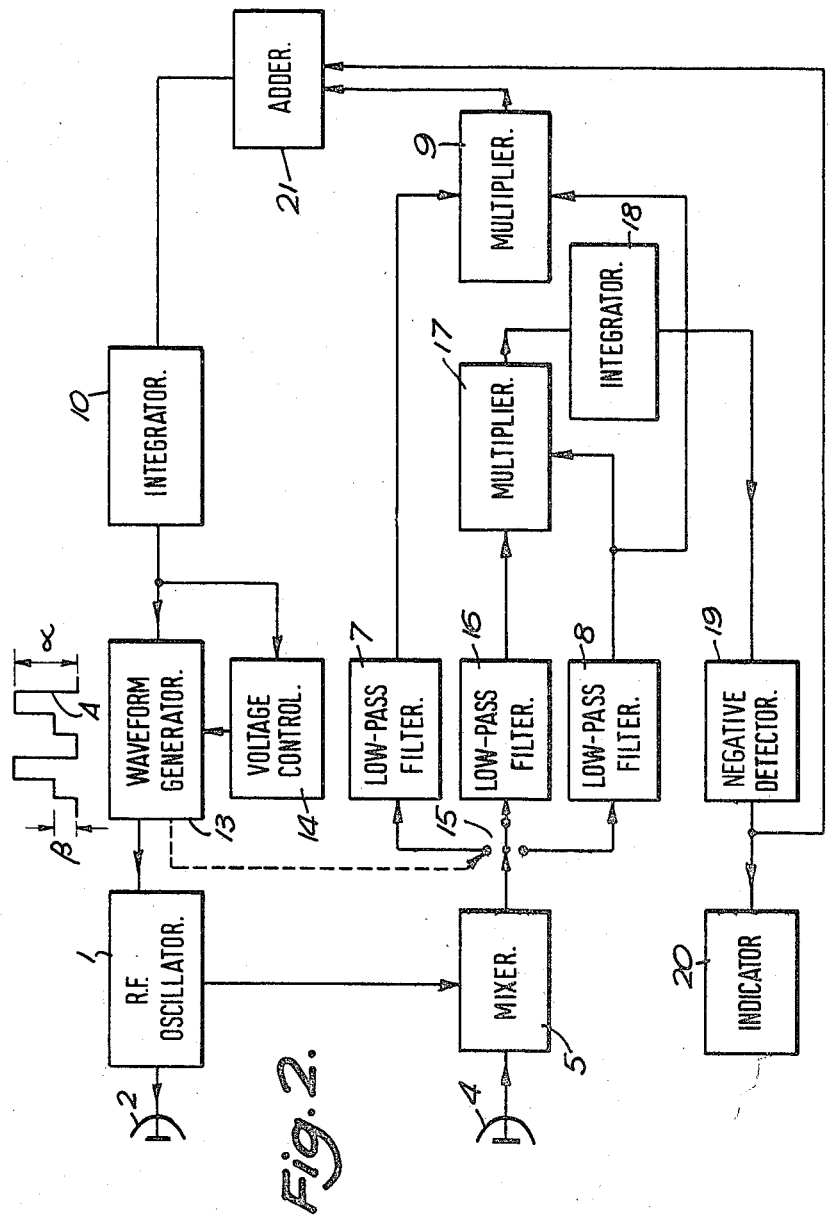

FIG. 2 illustrates a modification of the radar set shown in FIG. 1. The modified arrangement includes most of the features already described and the features common to FIGS. 1 and 2 are denoted by the same reference numerals.

In the modified arrangement of FIG. 2 the oscillator 3 of FIG. 1 is substituted by the waveform generator 13, which produces a repetitive double step waveform A of which the instantaneous amplitude determines the frequency of the radio frequency oscillator 1. The full amplitude α of this waveform is determined by the integrator 10 as before; the waveform includes an initial step which has a magnitude β which is a fixed fraction, in this case one third, of the full amplitude α, controlled by a voltage control 14 which may comprise a voltage divider which receives the output of the integrator 10.

There are accordingly three possible frequencies of radiation and accordingly a three position switch 15 is operated in a fixed phase relation with the switching of the frequency of the oscillator 1 so as to direct the beat frequencies derived from the three radiated frequencies to a respective one of three low pass filters. The outputs from the low pass filters 7 and 8 are derived from the frequencies corresponding to the base line and upper step of the waveform A and are multiplied by the multiplier 9 as already described. The control loop completed by the integrator 10 maintains the outputs of the filters 7 and 8 in quadrature as previously described.

The output of the third low pass filter 16 is the Doppler signal derived from the radiated frequency corresponding to the intermediate step in the waveform A. The outputs of the low pass filters 8 and 16 are multiplied by a multiplier 17 which feeds an integrator 18. A detector 19 is connected to the output of the integrator; the detector detects if the integrator's output is either zero or negative and thereupon causes an error indicator 20 to operate.

The purpose of the modified arrangement is to resolve a possible ambiguity if the detected range experiences a sudden change. This may occur if the radar is used as an altimeter and an aircraft carrying it passes over a cliff.

The phase difference between the outputs of the filters 7 and 8 should be $\pi/2$, and if so, the output of the integrator 18 will be positive, corresponding to a phase difference of $\pi/6$, namely one third of $\pi/2$. However, if that phase difference becomes momentarily $(4n-1)\pi/2$, where $n = 1, 2$ or $3$, then the output of the multiplier 17 will be zero. This condition is detected by the detector. In order to correct the error in the main loop, the detector will, upon detecting a zero or negative signal, apply a positive signal to an adder 21 to augment the output of the multiplier 9 and to force the main loop into correct operation.

The modified arrangement may resolve ambiguity as far as the thirteenth multiple of the correct range.

Another technique which is possible is to change the difference between the base line and the intermediate step of waveform A repeatedly, such as at five-second intervals, from zero up to a maximum of a predetermined fraction such as one third of the full height of the waveform, so as to produce a repetitive sweep of the corresponding frequency difference at the output of the oscillator 1. The rest of the system would operate as previously described.

An indication of range can be obtained from the embodiment of FIG. 2 in the same manner as previously described with reference to FIG. 1.

I claim:

1. A continuous wave radar comprising means for radiating signals of at least two frequencies, means for obtaining Doppler signals associated with each of two transmitted frequencies, multiplying means for receiving the two Doppler signals and producing a product signal and frequency control means responsive to said product signal for controlling the difference in frequency between the transmitted frequencies to maintain the two Doppler signals in quadrature.

2. A radar according to claim 1 in which the frequency control means comprises a waveform generator disposed to provide a waveform that repeatedly switches between different levels, and means for controlling the separation of the levels in accord with the product signal.

3. A radar according to claim 2 in which the said means for controlling comprises an integrator having an input connected to the multiplying means and an output connected to square wave oscillator.

4. A radar according to claim 2 in which the means for radiating signals comprises a variable frequency oscillator disposed for frequency control by the said waveform generator.

5. A radar according to claim 1 in which the means for obtaining Doppler signals comprises a mixer for transmitted frequencies and received echo signals, two low pass filters and a switch operable to connect an output of the mixer to the filters alternately in accordance with the switching of the said waveform.

6. A radar according to claim 5 in which the multiplying means comprises a four-quadrant multiplier coupled to the outputs of the two filters.

7. A radar according to claim 1, further comprising an indicator and means for obtaining a signal inversely proportional to the frequency difference between the first mentioned two frequencies for driving the indicator.

8. A radar according to claim 1 in which the means for radiating is operable to radiate a third frequency and means are provided for obtaining a Doppler signal derived therefrom, the radar further comprising means for controlling the difference between the third frequency and one of the said two frequencies to be a fraction of the difference between the said two frequencies, means for multiplying the Doppler signals derived from the third frequency and the said one frequency to provide a signal indicative according to its polarity of the presence and absence of unambiguous quadrature between the first mentioned two Doppler signals, and means for augmenting the said product signal when said indicative signal denotes an absence of unambiguous quadrature.

9. A continuous wave radar comprising a transmitter, a receiver, frequency control means and range indicator means; wherein said transmitter comprises a voltage-controlled variable frequency oscillator and an aerial coupled thereto; said receiver comprises an aerial, a mixer coupled to the aerial and said oscillator for producing different beat frequency signals in response to different transmitter frequencies, two low pass filters and a switch operable to connect the mixer to the said filters alternately, said frequency control means comprises a waveform generator disposed to provide an output waveform switching between first and second levels, an integrator for producing an output for controlling the difference between said levels and a multiplier having inputs coupled to said filter and an output coupled to the integrator; and said range indicator means comprises means for providing a signal inversely proportional to said output of said integrator, and means for indicating said inversely proportional signal.

10. A continuous wave radar according to claim 9, further comprising means for controlling said waveform generator to switch to and from a third level differing from said first level by a fraction of the difference between said first and second levels, a third low pass filter, said switch being operable to connect the mixer to each of the three filters in turn in accordance with the level of said output waveform, a second multiplier, coupled to multiply signals from said first and third filters, and means responsive to a non-positive output derived from said second multiplier to provide an additional signal to said integrator.

* * * * *